United States Patent [19]

Kühbach

[11] Patent Number: 4,815,159

[45] Date of Patent: Mar. 28, 1989

[54] WINDSHIELD WIPER SYSTEM FOR MOTOR VEHICLES

[75] Inventor: Gerd Kühbach, Bühlertal, Fed. Rep. of Germany

[73] Assignee: Robert Bosch GmbH, Stuttgart, Fed. Rep. of Germany

[21] Appl. No.: 30,066

[22] Filed: Mar. 24, 1987

[30] Foreign Application Priority Data

May 16, 1986 [DE] Fed. Rep. of Germany ....... 3616702

[51] Int. Cl.⁴ ................................................. B60S 1/20
[52] U.S. Cl. .............................. 15/250.21; 15/250.26; 15/250.23
[58] Field of Search ........... 15/250.21, 250.23, 250.24, 15/250.25

[56] References Cited

U.S. PATENT DOCUMENTS

| | | | |
|---|---|---|---|
| 954,158 | 4/1910 | Arzt | 15/250.24 |
| 2,158,254 | 5/1939 | Rosenberg | 15/250.23 X |
| 2,629,891 | 3/1953 | Greene | 15/250.23 |
| 2,790,195 | 4/1957 | Wrobel | 15/250.23 |
| 2,803,846 | 8/1957 | Harper | 15/250.23 |
| 2,901,764 | 9/1959 | Anderson | 15/250.25 |
| 3,525,115 | 8/1970 | Zoltok | 15/250.23 |
| 3,551,938 | 1/1971 | Yonke | 15/250.23 |
| 3,606,629 | 9/1971 | Parker | 15/250.21 |
| 3,667,082 | 6/1972 | Hoyler | 15/250.24 X |
| 3,978,542 | 9/1976 | van Eekelen | 15/250.23 X |
| 4,630,327 | 12/1986 | Schmidt | 15/250.21 |
| 4,639,966 | 2/1987 | Kuhbauch | 15/250.23 |

FOREIGN PATENT DOCUMENTS 2215307 6/1984 Fed. Rep. of Germany .

Primary Examiner—Timothy F. Simone
Assistant Examiner—K. L. O'Leary
Attorney, Agent, or Firm—Michael J. Striker

[57] ABSTRACT

A windshield wiper system for motor vehicles comprises an oscillating wiper arm and a radially displaceable wiper element lying on the windshield and supported on the wiper arm. In order to control forces caused by masses of the structural components moveable in the radial direction the wiper element is formed of two parallel portions which execute radial motions in opposite directions.

11 Claims, 2 Drawing Sheets

WINDSHIELD WIPER SYSTEM FOR MOTOR VEHICLES

BACKGROUND OF THE INVENTION

The present invention relates to a windshield wiper system for motor vehicles.

Windshield wiper systems of the type under consideration include a wiper arm, which is driven to oscillate between two end positions, and an elongated wiper element lying on the windshield and displaceable radially relative to the oscillation axis during the oscillating movement in the direction of its elongation. Such a windshield wiper system has been disclosed, for example in DE-PS 22 15 307. The problem with this otherwise satisfactory conventional device is that the wiper element is relatively large and heavy, and during the single wiping stroke from one end position to the other end position four radial movements, namely two movements outwards and two movements inwards, are carried out. Thus in order to meet the requirements of the construction with domineering masses considerable expenses are involved because positive and negative accelerations of the structural components moveable in the radial direction are quite significant.

A wiper system in which the wiper element is formed of two portions has been disclosed in U.S. Pat. No. 2,629,891. One inner portion of this wiper element is rigidly connected to the wiper arm whereas the outer portion of this element performs the radial displacement. The moveable masses as referred to the simple outer portion are in this solution somewhat smaller than those in the above described device. The problem mentioned hereinabove, however remains unsolved.

SUMMARY OF THE INVENTION

It is an object of the present invention to provide an improved windshield wiper system.

It is another object of the invention to provide a windshield wiper device in which two similar portions of the wiper element are guided with a full compensation for moveable masses because opposite radial movements can be made completely synchronous.

These and other objects of the invention are attained by a windshield wiper system for motor vehicles, comprising a wiper arm driven to oscillate; and an elongated wiper element lying on a windshield pane and supported on said wiper arm so that during an oscillatory movement of said wiper arm said wiper element is radially displaceable in the direction of elongation thereof relative to an axis of oscillation, said wiper element including two portions which are parallel to each other and extend in said direction of elongation, said two portions being radially displaceable in two opposite directions.

The system may further include an oscillating shaft connected with said wiper arm, said axis of oscillation lying along an axis of elongation of said shaft, said shaft having an axial bore; and motion translation means which extend through said bore for transmitting a drive motion for a radial displacement of said two portions.

The motion translation means may include at least one elongated element on which said two portions are supported and which is cooperating with a drive means effecting said drive motion.

The elongated element may be flexible or rigid.

The motion translation means may include two spaced inflexible slides each carrying one of said two portions, and a flexible intermediate piece connecting said slides to each other, said translation means further including a deflection roll mounted on said wiper arm and at least partially wrapped by said intermediate piece so that said slides are positioned at two sides of said wiper arm.

The translation means may further include guides rigidly connected to said wiper arm, said slides being guided in said guides.

The translation means may include cable means connected to said drive means, said cable means including two portions each connected to a respective one of said two portions of said wiper element.

The translation means may further include a cable means which has a portion which is connected to one of said slides at one end thereof and to a pulling cable of said drive means, and a restoring spring operatively connected to another of said slides, said spring generating a force counteracting to a drive pulling motion of said drive means.

The motion translation means may include two parallel spaced toothed racks and a pinion which is in mesh with each of said toothed racks, a pulling element connected to said drive means and to one of said toothed racks, and a restoring spring connected to another of said toothed racks, said restoring spring generating a force which acts counter to a drive pulling motion of said drive means.

The motion translation means may include a housing having walls which form guides for said toothed racks, said housing accommodating said racks and said pinion.

The portions of said wiper element may be pivotally connected with said motion translation means and have pivot axes which extend substantially in a direction of oscillation of said wiper element.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

DETAILED DESCRIPTION OF THE PREFERRED EMBODIMENTS

Figure 1:
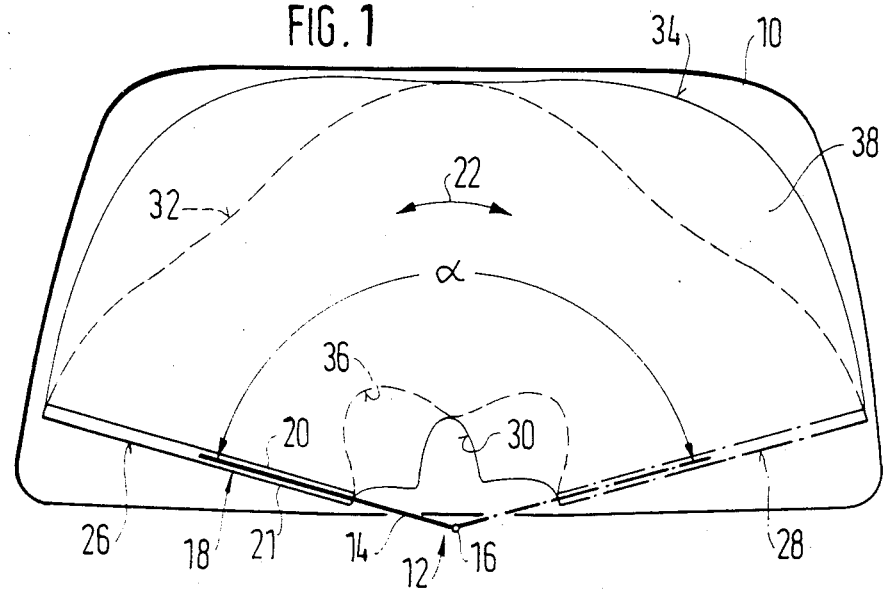
FIG. 1 is a schematic front view of the windshield wiper device of the invention.

Referring now to the drawings in detail and firstly to FIG. 1 thereof, it will be seen that a wiper device 12 corresponds to a windshield pane 10. The wiper device 12 includes a wiper arm 14 which is terminated with an oscillation axle 16. On the other, free end of the wiper arm 14, is provided a wiper element 18. The latter has two parallel portions 20 and 21 which together with the wiper arm 14 are moved over an oscillation angle α along the windshield pane 10. One reverse position 26 of the wiper element 18 is shown in FIG. 1 in solid line while the other position 28 of this element is depicted in dash-dotted line.

During the oscillating motion of the wiper element indicated by double arrow 22, both portions 20 and 21 forming the wiper element 18 execute with reference to the pivot axle 16 radial displacements in opposite directions. These displacements are adjusted to the oscillation motion 22 so that the end of the inner portion 20 which faces the oscillation axle 16 is moved along the line 30. The end of the inner portion 20 which faces away from the oscillation axle 16 is moved along the curve indicated by dash-dotted line 32. At the same time, the end of the external portion 21, which faces away from the axle 16 is moved along the line 34, whereas the inner end of the external portion 21, which faces the oscillation axle 16 is moved along dash-dotted line 36. The wiper element 18 sweeps over the field 38 to be wiped. This field is limited by two oscillation end positions 26, 28 of the wiper element 18 and two curved lines 30 and 34.

Figure 2:
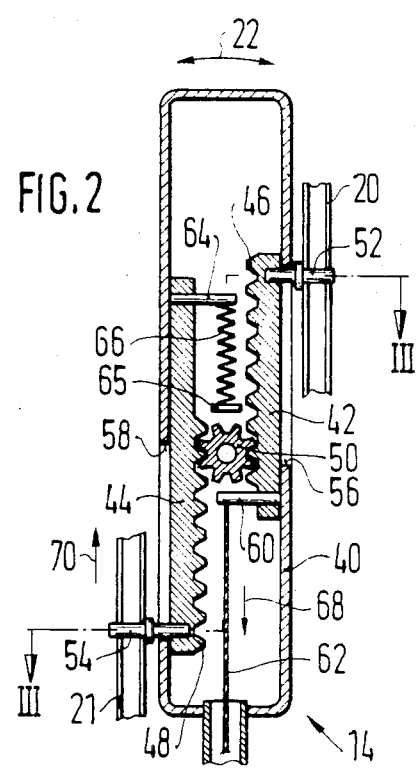
FIG. 2 is an axial sectional view of the wiper arm of the device of FIG. 1, on enlarged scale.
Figure 3:
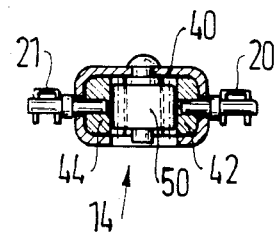
FIG. 3 is a sectional view taken along line III—III of FIG. 2.

FIG. 2 illustrates the structure of the wiper device by which the oppositely directed radial movements of two portions 20 and 21 of the wiper element 18 are effected. The wiper arm 14 is provided at its free end with a closed circular housing 40, in which two toothed racks 42 and 44 are radially displaceable in respect to the oscillation axle 16. Thereby two toothings 46 and 48 of racks 42 and 44 face each other, but are spaced from each other. An intermediate gear 50 positioned between two toothed racks 42 and 44 is rotationally supported in housing 40. Gear 50 is in mesh with both toothings 46 and 48 as shown in FIGS. 2 and 3. Each toothed rack 42 and 44 is provided with a pivot axis 52, 54, respectively, each extending substantially in the direction of oscillation (double arrow 22) of the wiper arm 14. Both pivot axes 52 and 54 extend through elongated openings 56 and 58 formed in the wall of the housing 40. A pulling cable 62 is engaged on the rack 42 via a connecting pin 60. Pulling cable 62 leads to a non-shown drive device. On the other toothed rack 44 is engaged, via a pressure pin 64, a helical spring 66 which is supported on a housing shoulder 65.

When the pulling cable 62 is moved by the non-illustrated drive device in the direction of arrow 68 this movement is transmitted to the toothed rack 42 and thereby to the portion 20 of wiper element 18. At the same time, the intermediate pinion 50 rotates in clockwise direction and thus displaces the toothed rack 44 and the portion 21 therealong in the direction of arrow 70. With the adjustment movement in the direction of arrow 70, the prestressed helical spring 66 is further stressed. When, however, the pulling cable 62 is unloaded by the drive device the helical spring 66 urges the toothed rack 44 and thus the portion 21 of the wiper element 18 back to their initial position according to FIG. 2. By means of the pinion 50 which now rotates in counterclockwise direction the toothed rack 42 and the portion 20 therewith are moved back to their initial position. The motion translation means include also, in addition to the pulling cable 68, both toothed racks 42, 44, the intermediate gear 50 and the restoring spring 66.

The drive movement for the radial displacement of the wiper element portions 20 and 21 can be executed, for example by a drive device disclosed in DE-OS 34 11 160, the disclosure of which can be incorporated herein. Any other suitable conventional device can be also utilized for this purpose. It is clear that the pulling cable, which is the part of the aforementioned known device, is connected with the pulling cable 62 of FIG. 2 so that a desired displacement of portions 20 and 21 of the wiper element 18 be obtained.

Figure 4:
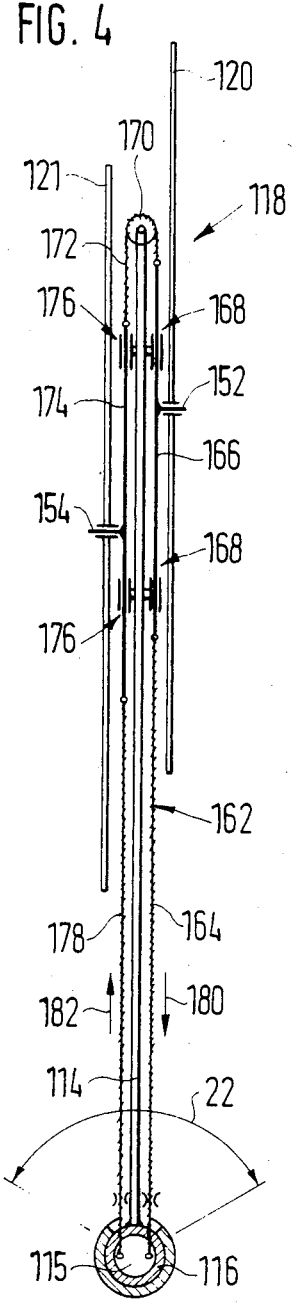
FIG. 4 is a schematic view of the modified embodiment of the invention.

In the embodiment shown in FIG. 4, the pulling cable 162 which serves to translate the motion from the drive to the translation means if the cable is formed as a multi-part element. A first portion 164 of this cable is connected to a rigid slide 166 which is guided in guides 168 which are rigidly secured to the wiper arm 114. A rotatable deflection roller 170 is supported at the free end of the wiper arm 114, which roller is partially wrapped around by an intermediate piece 172 of the pulling cable 162. The intermediate cable piece 172 is rigidly connected to the wiper arm 114. FIG. 4 further shows that at two sides of the slides 166, 174, which face away from each other relative to the wiper arm 114, pivot axes 152,154 are connected, which axes extend in the direction of double arrow 22. One of two portions 120, 121 of the wiper element 118 is oscillatingly supported at each of the pivot axes 152, 154. Finally, a further portion 178 of the pulling cable 162 is connected to the slide 174. This portion 178 is together with the portion 164 of the pulling cable 162 is guided through a central bore 115 of a tubular oscillating shaft 116. Both portions 164 and 178 of the pulling cable 162 lead to and are connected with the aforementioned drive device.

When now the cable portion 164 is moved in the direction of arrow 180 the slide 166 and the portion 120 therewith are moved in the direction of arrow 180. Slide 174 is taken along by the intermediate cable piece 172 and is displaced in the direction 182 whereby the portion 121 of the wiper element 118 is also taken along. The counter movement in this case is effected by the drive device which pulls the portion 178 of the cable 162 in the direction opposite to arrow 182, whereby slides 174,166 will move together with the portions 120, 121 and also the intermediate piece 172 of the pulling cable 162 in the direction counter to that indicated by arrows 182, 180. The motion transmission means thus include in this embodiment cable portions 164, 172, 178 and two rigid portions 166, 174.

Figure 5:
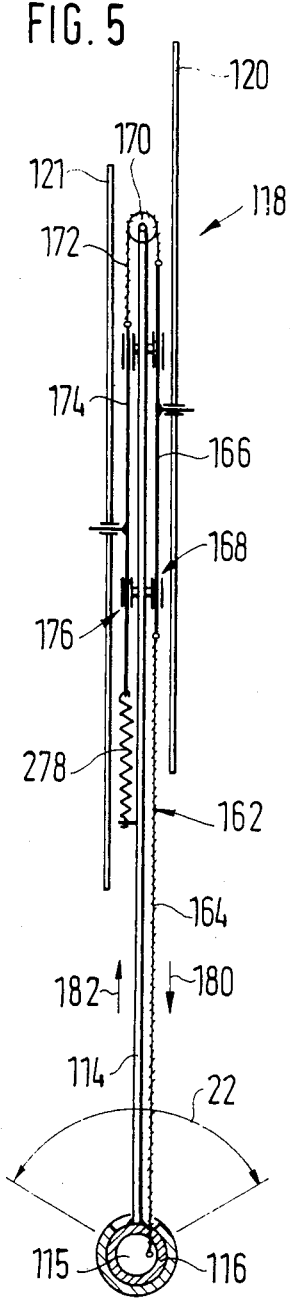
FIG. 5 is a schematic view of yet another embodiment of the invention.

The embodiment of FIG. 5 substantially corresponds to that of FIG. 4. Therefore all the elements described in connection with FIG. 4 have the same reference numerals in FIG. 5. The difference between the embodiment depicted in FIG. 5 and that of FIG. 4 resides in that in place of the cable portion 178, a prestressed restoring spring 278 is provided, one end of which faces away from the slide 174 and is secured to the wiper arm 114. When the drive device acts, via the pulling cable 162 on the slides 166, 174 in the direction of arrow 180 the restoring spring 278 will be further stressed. Upon unloading of the pulling cable 162 the restoring spring 278 urges two slides 176, 174 and portions 120, 121 therewith to their initial positions. The pulling cable 162 in this case is guided via the central bore of the oscillating shaft 116 of the drive device.

All the embodiments have in common that the elongated wiper element 18 is comprised of two portions 20, 21 or 120, 121 which are arranged adjacent each other along the direction of their elongation and which during the oscillating movement 22 execute the radial motions in opposite directions 70, 71, or 180, 182.

The wiper system according to the invention is easy and inexpensive to make and reliable in operation.

It will be understood that each of the elements described above, or two or more together, may also find a useful application in other types of wiper systems for vehicle windshields differing from the types described above.

While the invention has been illustrated and described as embodied in a wiper system for windshields of power vehicles, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

1. Windshield wiper system for motor vehicles, comprising a wiper arm driven to oscillate; an elongated wiper element lying on a windshield pane and supported on said wiper arm so that during an oscillatory movement of said wiper arm said wiper element is radially displaceable in the direction of elongation thereof relative to an axis of oscillation, said wiper element including two portions which are parallel to each other and extend in said direction of elongation; means effecting a relative displacement of said two parallel portions of said wiper element during said oscillatory movement in two opposite directions radially in respect to said axis; and an oscillating shaft connected with said wiper arm, said axis of oscillation lying along an axis of elongation of said shaft, said shaft having an axial bore; said displacement effecting means including motion transmitting means (61, 162) which extend through said bore for transmitting a drive motion for said radial displacement of said two portions relative to each other.

2. The system as defined in claim 1, wherein said displacement effecting means include at least one elongated element (42, 44, 166, 174) on which said two portions are supported and which is cooperating with a drive means effecting said drive motion.

3. The system as defined in claim 2, wherein said elongated element is flexible.

4. The system as defined in claim 2, wherein said elongated element is inflexible.

5. The system as defined in claim 2, wherein said displacement effecting means includes two spaced inflexible slides (166, 174) each carrying one of said two portions, and a flexible intermediate piece (172) connecting said slides to each other; said translation means further including a deflection roll (170) mounted on said wiper arm (114) and at least partially wrapped by said intermediate piece so that said slides are positioned at two sides of said wiper arm.

6. The system as defined in claim 5, wherein said displacement effecting means further include guides (168) rigidly connected to said wiper arm, said slides being guided in said guides.

7. The system as defined in claim 6, wherein said translation means further include a cable means which has a portion (164) which is connected to one of said slides at one end thereof and to a pulling cable of said drive means, and a restoring spring (278) operatively connected to another of said slides, said spring generating a force counteracting to a drive pulling motion of said drive means.

8. The system as defined in claim 5, wherein said translation means includes cable means connected to said drive means, said cable means including two portions (164,178) each connected to a respective one of said two portions of said wiper element.

9. The system as defined in claim 2, wherein said motion translation means include two parallel spaced toothed racks (42, 44) and a pinion (50) which is in mesh with each of said toothed racks, a pulling element (62) connected to said drive means and to one of said toothed racks, and a restoring spring (66) connected to another of said toothed racks, said restoring spring generating a force which acts counter to a drive pulling motion of said drive means.

10. The system as defined in claim 9, wherein said motion translation means include a housing (40) having walls which form guides for said toothed racks, said housing accommodating said racks and said pinion.

11. The system as defined in claim 2, wherein said portions of said wiper element are pivotally connected with said motion translation means and have pivot axes (52, 54; 152, 154) which extend substantially in a direction of oscillation of said wiper element.

* * * * *